UNITED STATES PATENT OFFICE.

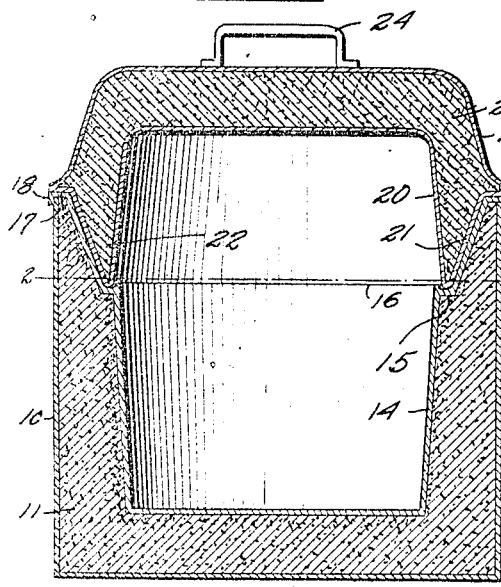
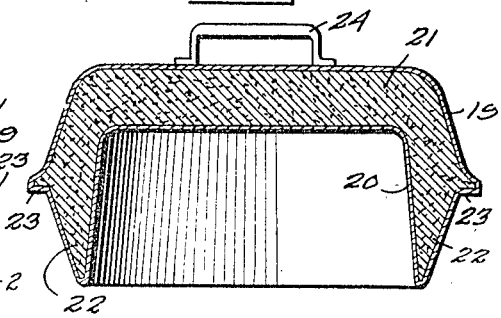
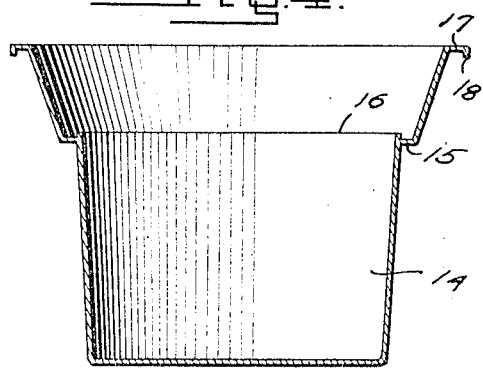
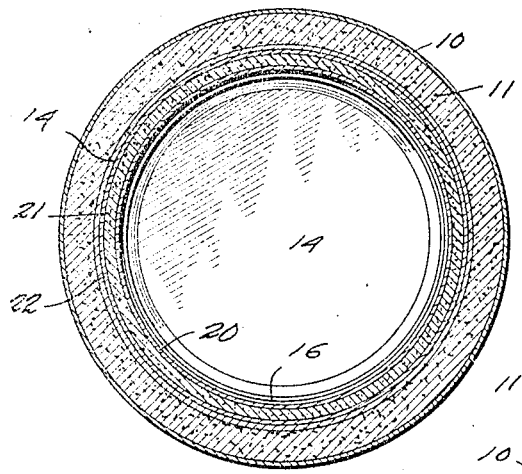
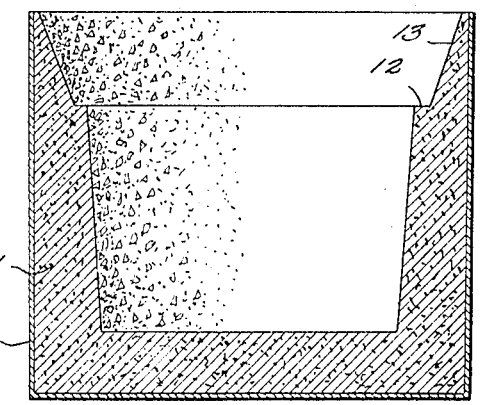
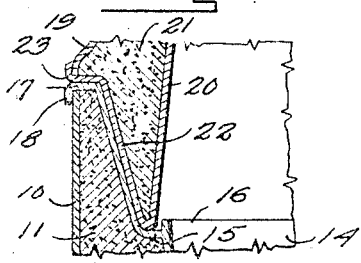
M. R. & O. P. HALL.
FIRELESS COOKER.
APPLICATION FILED NOV. 22, 1917.
1,298,202. Patented Mar. 25, 1919.
Inventor
Max R. Hall and
Olin P. Hall,

MAX R. HALL AND OLIN P. HALL, OF ATLANTA, GEORGIA.

FIRELESS COOKER.

1,298,202.  Specification of Letters Patent.  Patented Mar. 25, 1919.

Application filed November 22, 1917. Serial No. 203,417.

*To all whom it may concern:*

Be it known that we, MAX R. HALL and OLIN P. HALL, citizens of the United States and residents of Atlanta, in the county of Fulton and State of Georgia, have invented a certain new and useful Improvement in Fireless Cookers, of which the following is a specification.

The present invention relates to fireless cookers, and has for an object to provide a device of this character which is light in weight, which comprises relatively few parts, and which is of compact structure.

Another object of the present invention is to provide a fireless cooker for domestic use which comprises, principally, but three parts which may be readily separated, wherein the body part and the cover part together forms the hot sealed chamber and admit of ready access to utensils and the like placed within the body part when the cover part is removed; to provide the fireless cooker with an inner casing or main shell in the form of a removable receptacle which may be readily withdrawn from the body portion for washing and drying after use, which may be interchanged, and which may be readily substituted when worn out or damaged.

The invention further aims at the provision of a fireless cooker embodying the above advantages, and in addition thereto to provide a construction wherein the moisture of condensation against the inner side of the cover is utilized for effecting a liquid seal to prevent the interchange of thermo units between the interior and the exterior of the device.

The above, and various other objects and advantages of this invention will be in part described, and in part understood, from the following detailed description of the present preferred embodiment, the same being illustrated in the accompanying drawing wherein:

Figure 1 is a vertical central section taken through a fireless cooker constructed according to the present invention.

Fig. 2 is a horizontal section taken through the same substantially on the plane indicated by the line 2—2 of Fig. 1.

Fig. 3 is a vertical section taken through the cover, removed.

Fig. 4 is a detail vertical sectional view through the inner receptacle or lining of the device.

Fig. 5 is a similar view through the body portion or shell of the device.

Fig. 6 is a fragmentary vertical sectional view through the joint between the three parts of the device when assembled.

Referring to this drawing, the body part is in the form of a casing 10 which may be of any suitable configuration, which in the present instance is shown as of cylindrical form. Fitting within the casing 10 is a relatively thick lining of asbestos, magnesium, or other suitable heat nonconducting substance 11, the inner wall of which slopes inwardly to reduce the diameter of the body portion at the lower end of the chamber therein. The inner wall of the lining or packing 11 is offset outwardly to form a shoulder 12 and flares from the outer edge of the shoulder 12 to the top of the body portion. The outwardly flaring upper end of the inner wall of the body portion forms a seat 13.

Fitting in the body portion is a shell or lining 14 formed to the configuration of the inner wall of the body portion and which is provided near its upper end with an outwardly extending shoulder 15 adapted to seat upon the shoulder 12 and which is provided at its inner edge portion with an upstanding annular rib 16 forming an annular channel or trough, the bottom of which is formed by the shoulder 15. The lining or shell 14 flares upwardly from the shoulder 15 to conform to the seat 13 and is adapted to rest thereagainst. The upper marginal edge of the shell 14 is provided with an outstanding flange 17 adapted to engage over and rest upon the upper edge portion of the body, and may be provided with a depending annular rib 18 adapted to engage against the exterior surface of the casing 10.

The cover part of the fireless cooker is in the form of a relatively deep cap and may comprise concentrically disposed and widely spaced apart outer and inner shells 19 and 20 having a heat nonconducting packing 21 arranged therebetween. The inner shell 20 comprises the inner wall of the closure and flares downwardly to the open end of the closure and is returned outwardly and abruptly to form a wedge-shaped annular flange 22 adapted to engage against the inner side or wall of the shell 14 of the body. The lower end of the flange 22 is relatively narrow and is adapted to seat upon the shoulder 15 within the channel or trough, and is of less thickness than the width of the shoulder 15 to provide, as shown in detail in Fig. 6, a space between the rib 16 and the inner wall of the shell 20. The upturned lower edge portion of the inner shell 20, which flares upwardly from the open end of the closure, is turned outwardly to provide an annular supporting shoulder 23 adapted to seat upon the flange 17 of the lining 14 of the body part, and which is suitably secured to the upper outer shell 19. The closure part is provided with a handle 24 on its upper end by means of which the closure may be readily positioned upon the body part and removed therefrom.

The fireless cooker of this invention therefore comprises substantially but three parts: the body part, the inner lining or shell 14 adapted to be removably positioned in the body part, and the closure part which is adapted to fit at its lower end within the seat formed in the upper end of the lining 14. It will be noted particularly that the inner sealed chamber of the cooker is formed in part by the body portion, and in part by the closure portion so that when the latter is removed from the body portion, utensils and the like placed within the cooker may be readily removed owing to the relatively shallow concavity in the body part.

When the device is in use, and is closed, the water of condensation collecting upon the inner shell 20 of the closure is directed downwardly into the trough and is retained therein by the annular bead 16 to form a liquid seal at the lower edge of the closure part. As the flange 22 which fits into the upper end of the body part is of wedge-shape, the closure member may be readily forced down into the upper end of the body part to effectively seal the space or crevice between the two parts, and when the water of condensation trickles down the inner wall of the closure part into the channel, the sealing of the two parts is complete. The inner shell 14 of the body may be readily removed therefrom when the closure part is lifted out of place, and the entire device may be readily cleansed and dried as all of the parts are of simple construction and have no crevices or overturned portions to which access cannot be readily gained.

It is of course understood that various changes and modifications may be made in the details of construction of the above specifically described embodiment of this invention without departing from the spirit thereof, such changes and modifications being restricted only by the scope of the following claims.

We claim:

1. In a fireless cooker, the combination, of a body part including a rigid mass of heat non-conducting substance, shaped to provide an inner wall sloping inwardly to reduce the diameter of the body portion at the lower end thereof and offset outwardly to form a shoulder, and a removable shell formed to the configuration of the inner wall of said mass and provided near its upper end with an outwardly extending shoulder adapted to seat upon the shoulder of said mass.

2. In a fireless cooker, the combination, of a body part including a mass of heat non-conducting substance, shaped to provide an inner wall sloping inwardly to reduce the diameter of the body portion at the lower end thereof and offset outwardly to form a shoulder, a removable shell formed to the configuration of the inner wall of said mass and provided near the upper end with an outwardly extending shoulder adapted to seat upon the shoulder of said mass, a cover for said body part having its lower portion reduced for fitting in said shell whereby the lower edge of the cover will rest upon said shoulder, said cover having a dome shaped recess extending upwardly therein above the upper terminal of said reduced lower portion for coaction with the shell to receive an article of greater height than the depth of the shell.

3. In a fireless cooker, the combination, of a body part including a mass of heat non-conducting substance, shaped to form an inner wall sloping inwardly to reduce the diameter of the body portion at the lower end thereof and offset outwardly to form a shoulder, a removable metal shell formed to the configuration of the inner wall of said mass and provided near its upper end with an outwardly extending shoulder adapted to seat upon the shoulder of said mass, a cover for said body part having its lower portion reduced for fitting in said shell whereby the lower edge of the cover will rest upon said shoulder, said cover having a dome shaped recess extending upwardly therein above the upper terminal of said reduced lower portion for coaction with the shell to receive an article of greater height than the depth of the shell, the outer surface of the reduced portion of said cover snugly fitting against the inner surface of the shell above the shoulder thereon to form a tight joint between the cover and the body part, the shoulder of said shell being slightly wider than the thickness of the lower edge of the cover to form an annular trough, the wall of the recess in said cover flaring outwardly as it extends toward said trough to guide condensation therefrom to said trough.

4. In a fireless cooker, the combination, of a body part, having an inner wall offset outwardly to form a shoulder, a removable metal shell formed to the configuration of the inner wall and provided near the upper end with an outwardly extending shoulder adapted to seat upon the shoulder of said body part, a cover for said body part, said cover having a dome shaped recess extending upwardly therein for coaction with the shell to receive an article of greater height than the depth of the shell, the shoulder of said shell being slightly wider than the thickness of the lower edge of the cover to form an annular trough, the wall of the dome shaped recess in said cover flaring outwardly as it extends toward said trough to guide condensation therefrom to the trough.

MAX R. HALL.
OLIN P. HALL.